Feb. 2, 1932.  A. J. SILVA  1,843,343
CONTINUOUS FEED HAY PRESS
Filed Nov 18, 1929  9 Sheets-Sheet 1
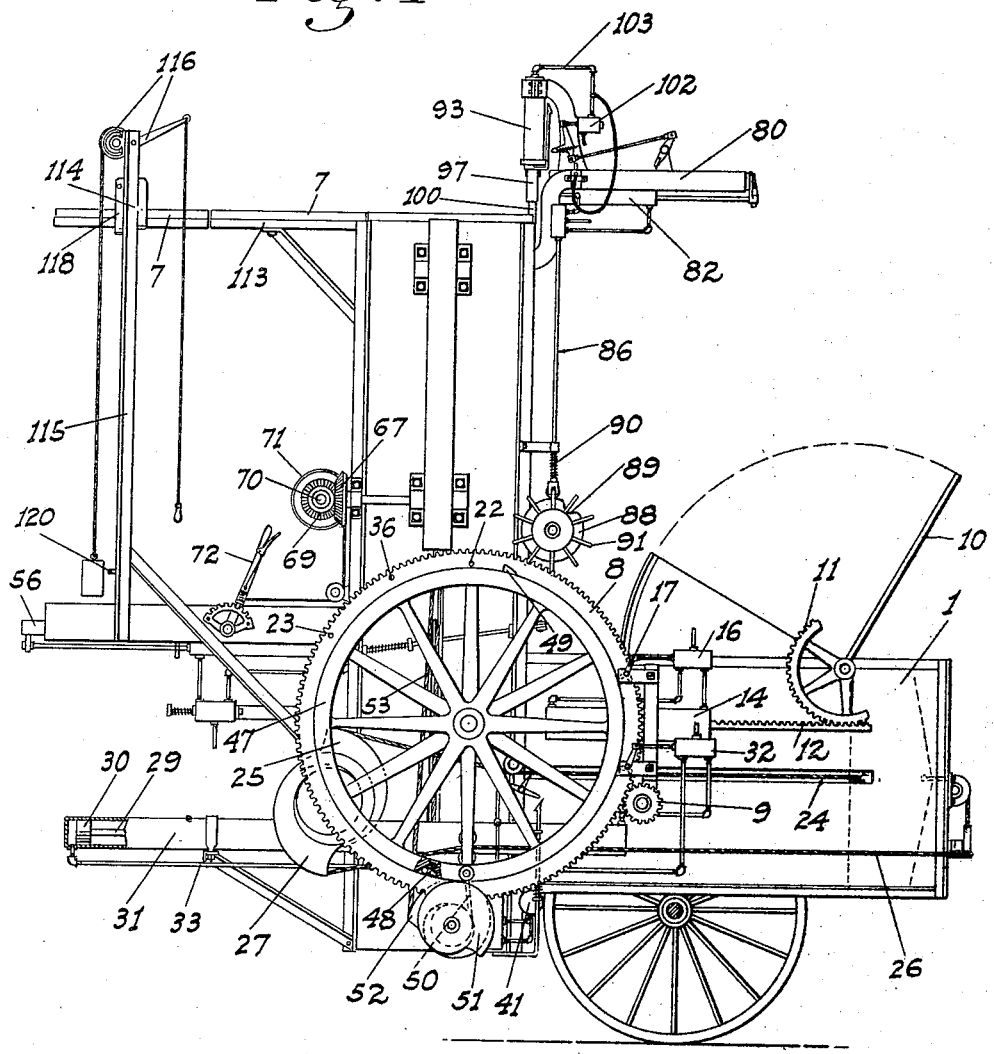
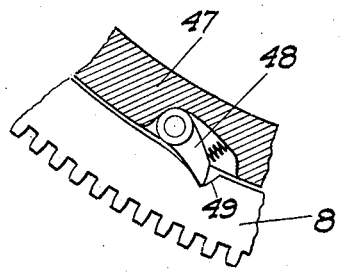
INVENTOR
A. J. Silva
BY
ATTORNEY

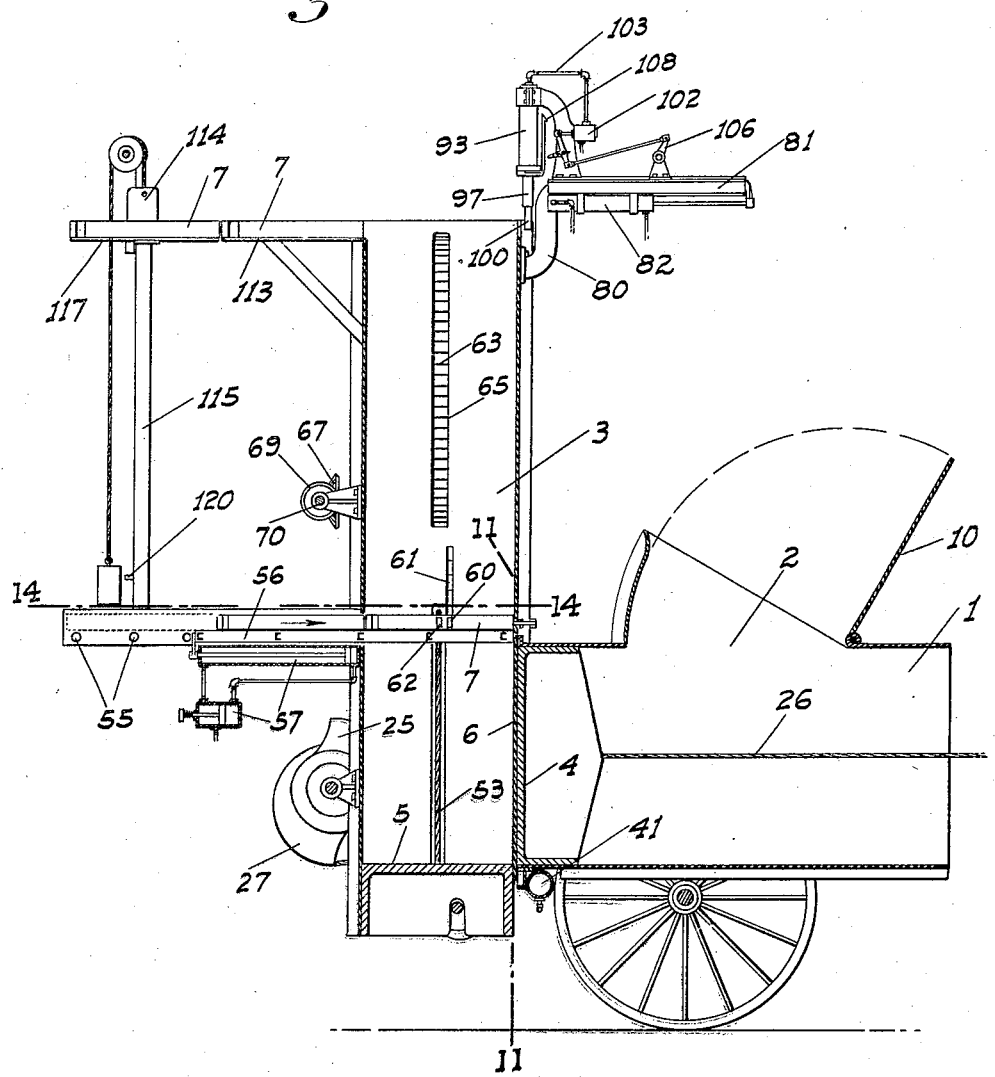

Feb. 2, 1932.  A. J. SILVA  1,843,343
CONTINUOUS FEED HAY PRESS
Filed Nov 18, 1929    9 Sheets-Sheet 3
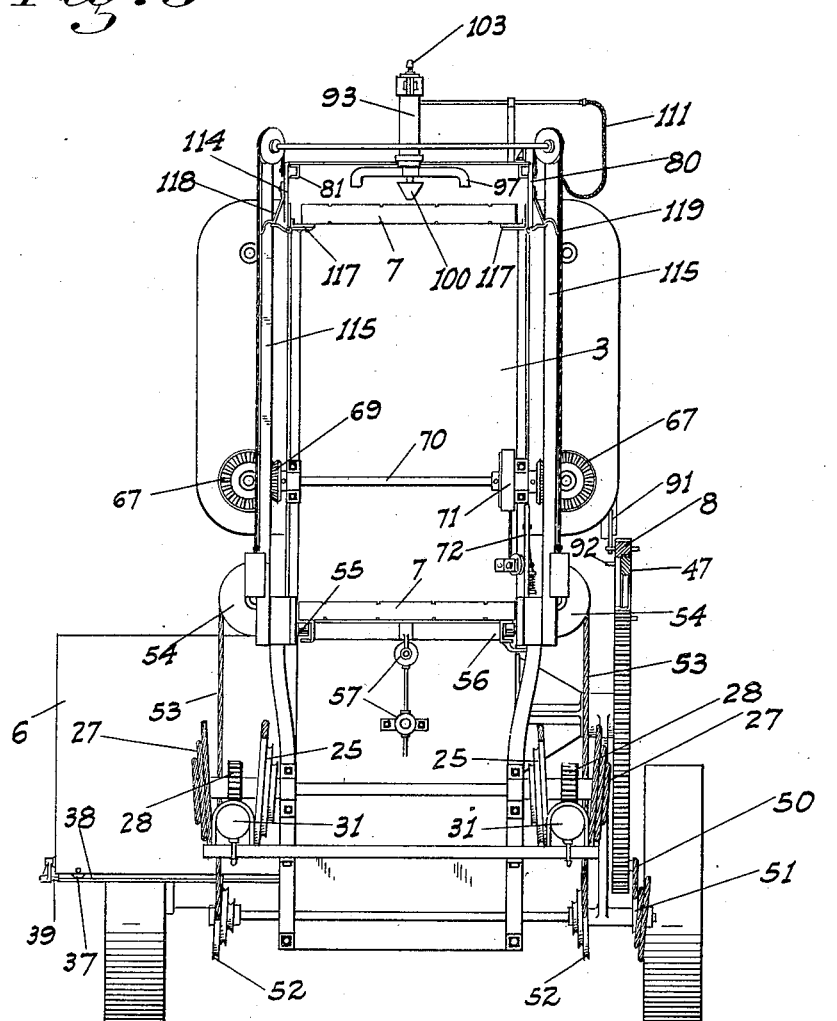
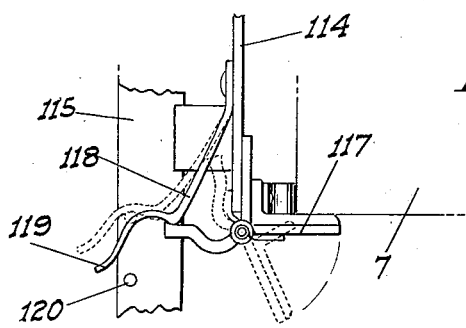

Feb. 2, 1932.  A. J. SILVA  1,843,343
CONTINUOUS FEED HAY PRESS
Filed Nov 18, 1929  9 Sheets-Sheet 4
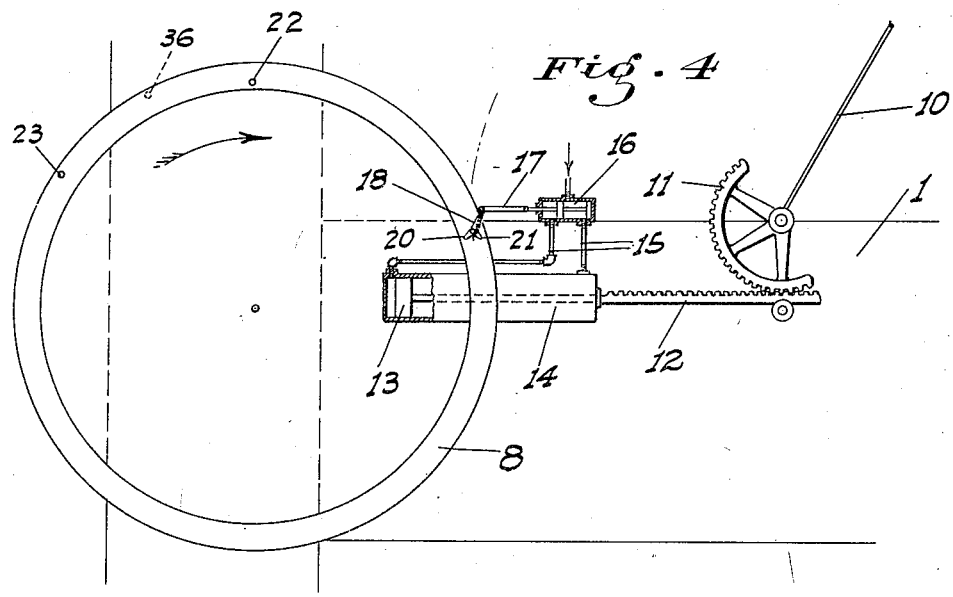
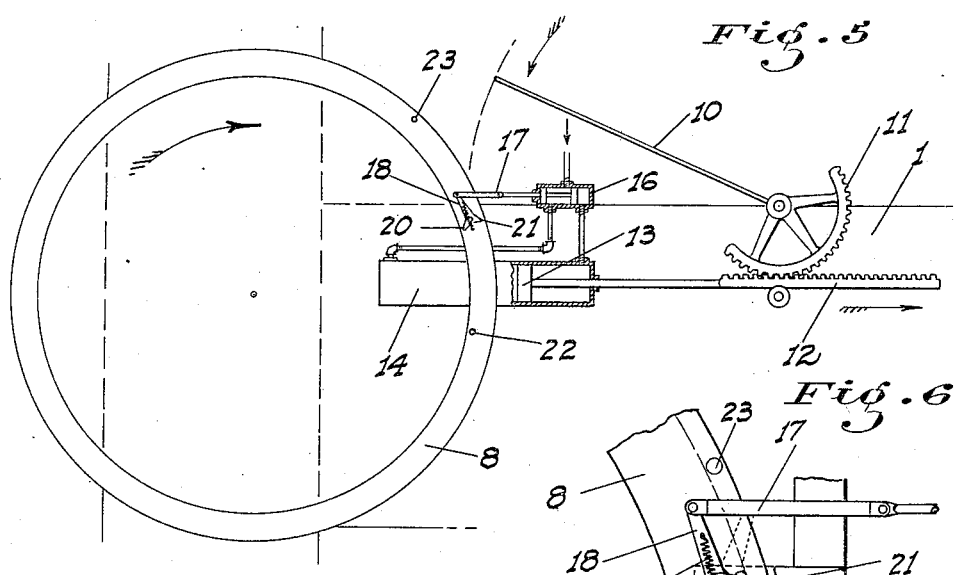
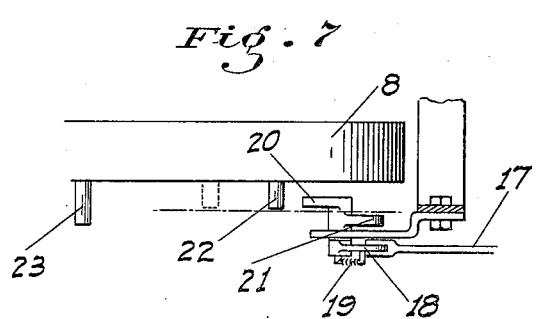
INVENTOR
A. J. Silva
BY
ATTORNEY

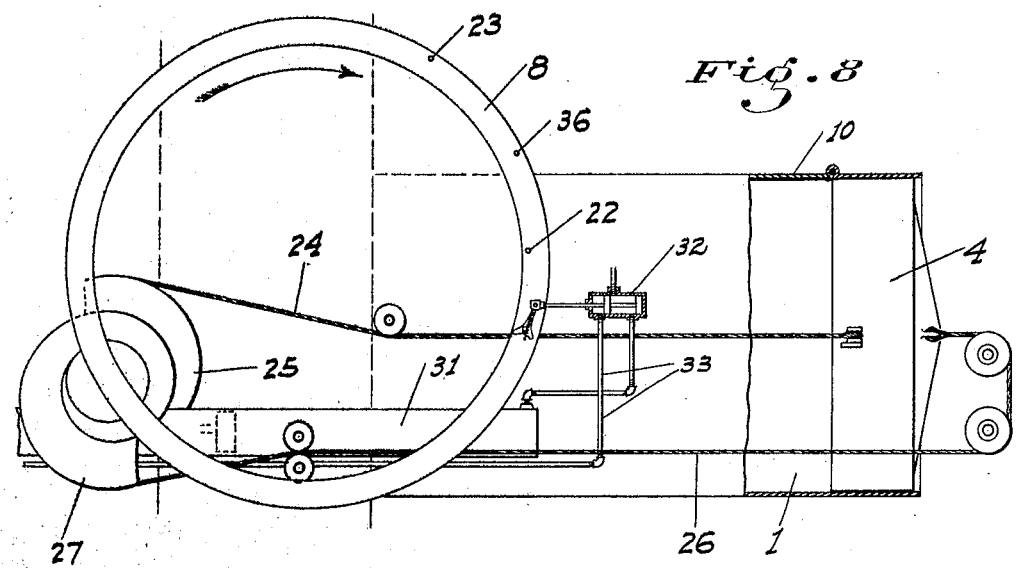
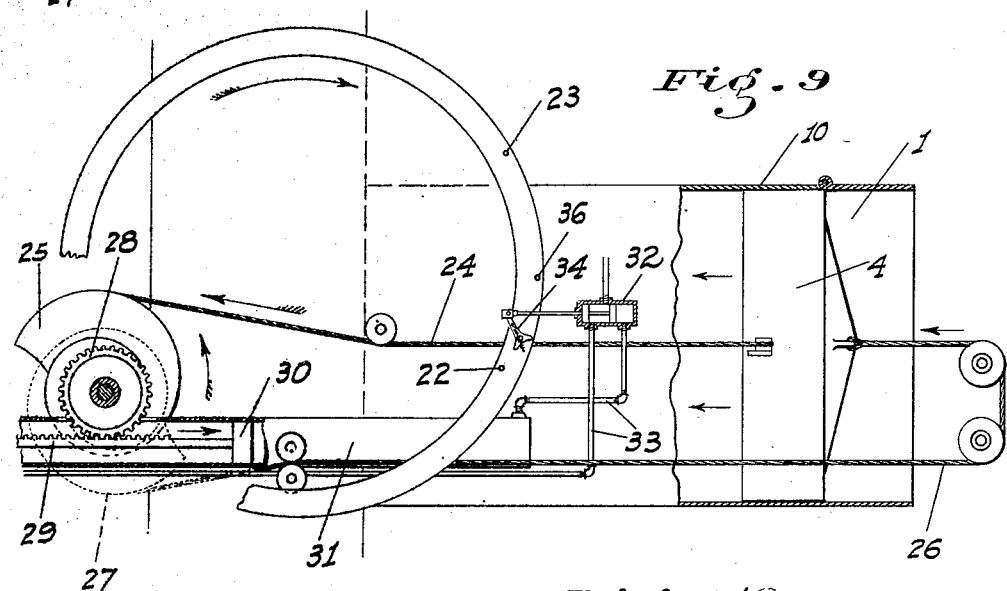
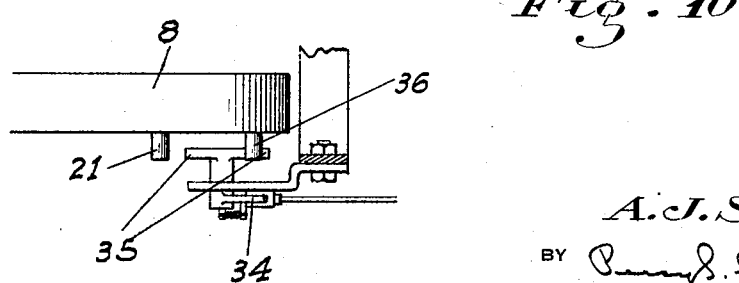

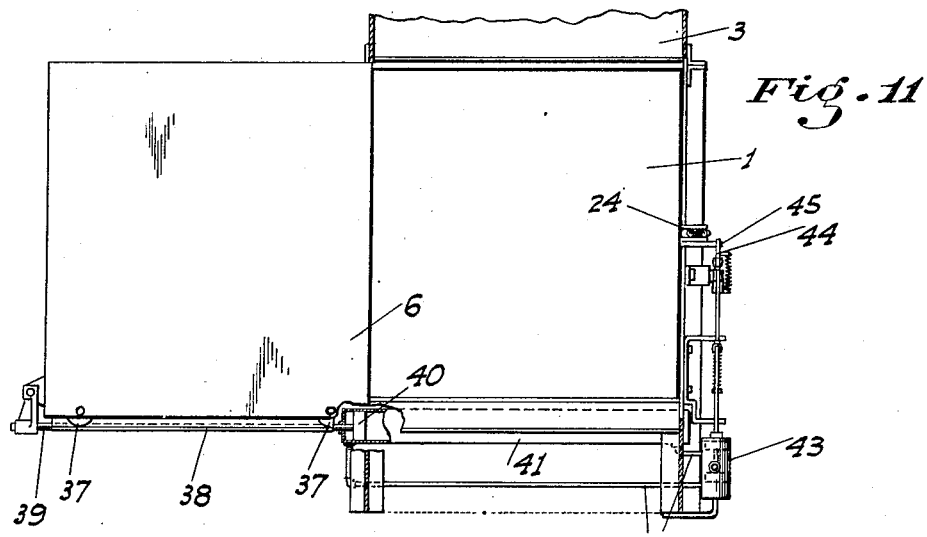
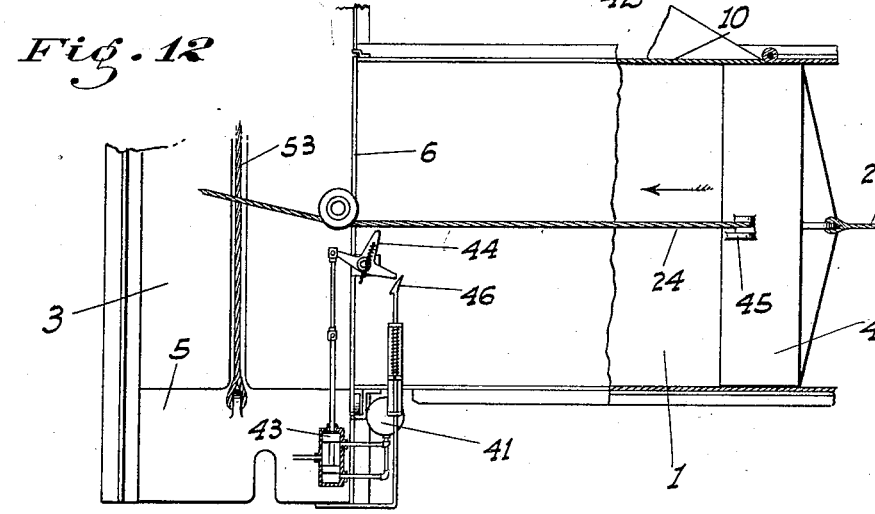
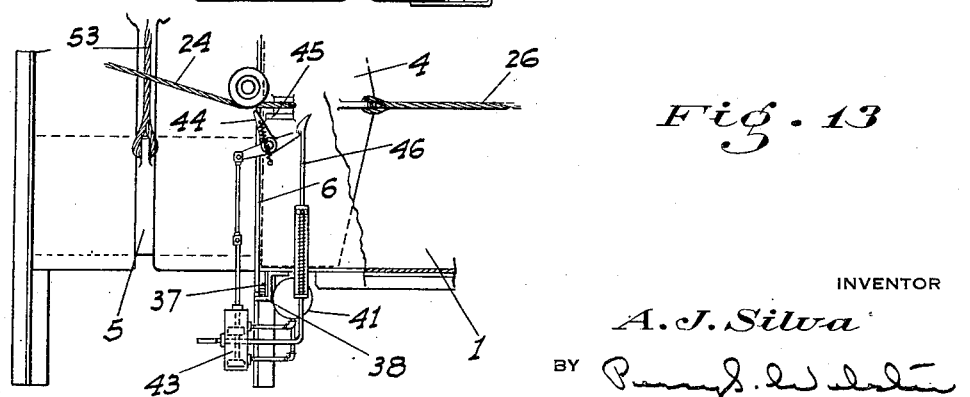

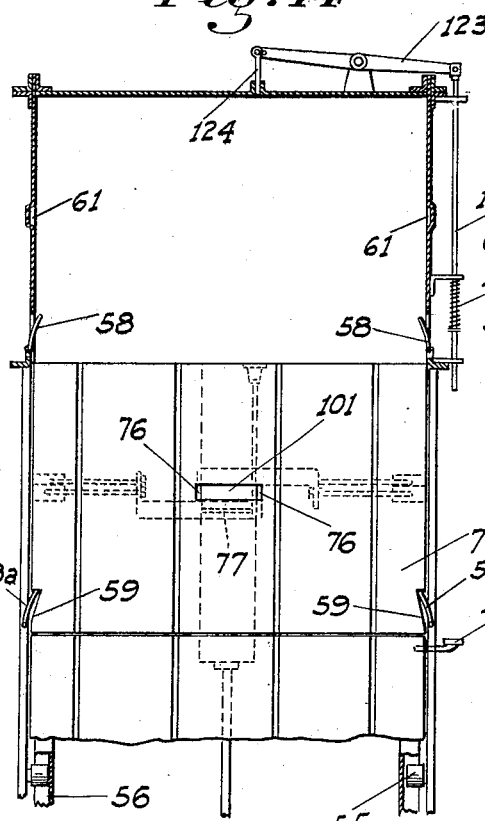
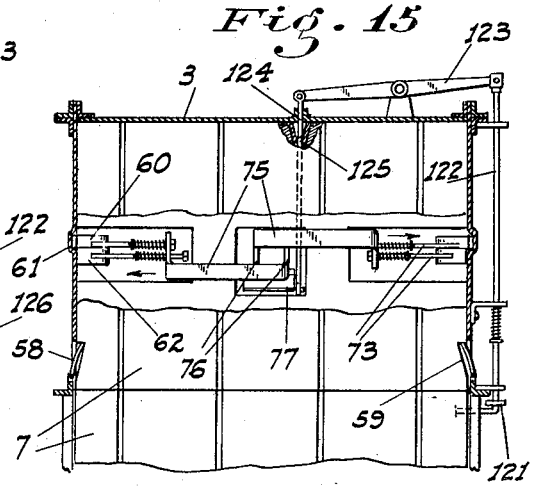
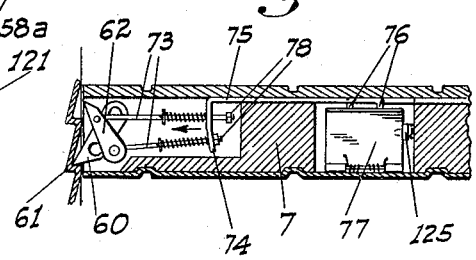
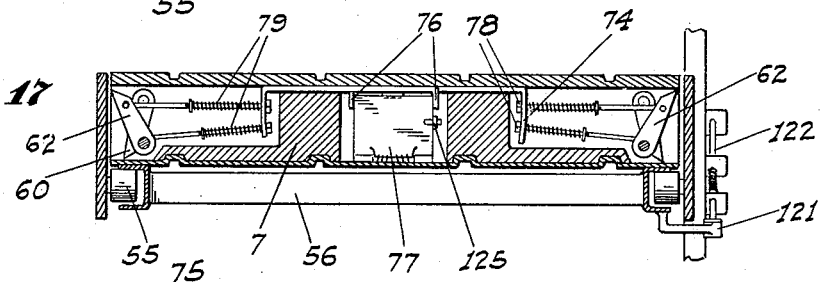

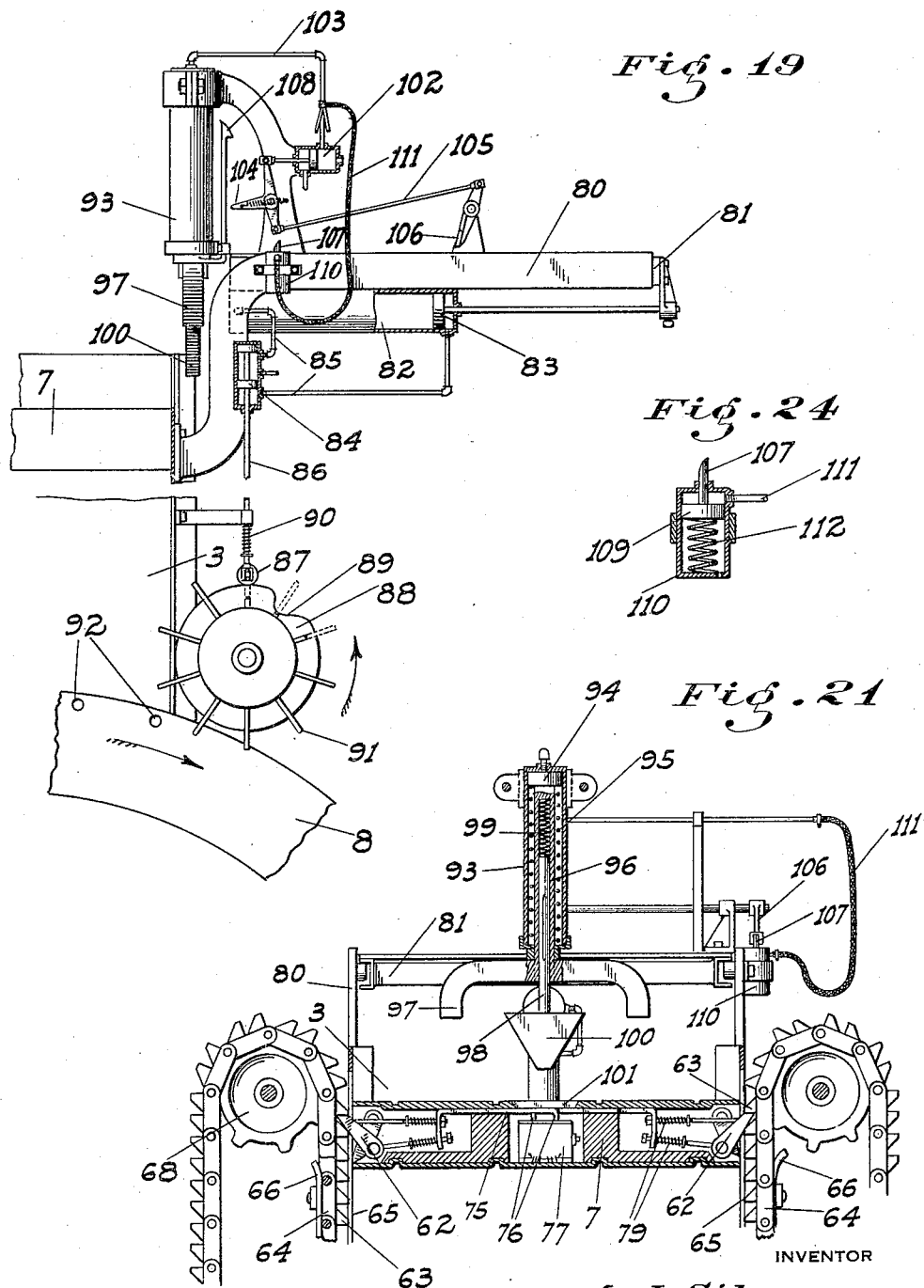

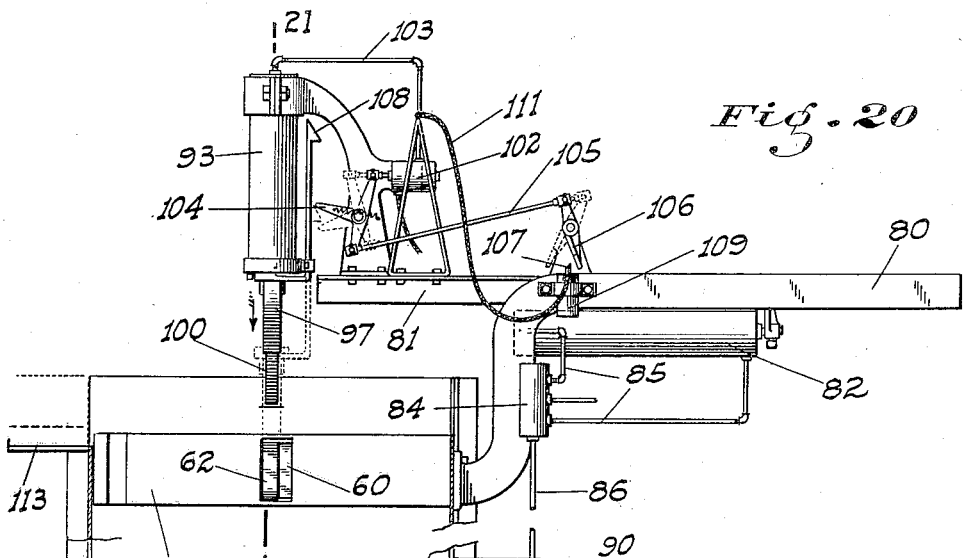
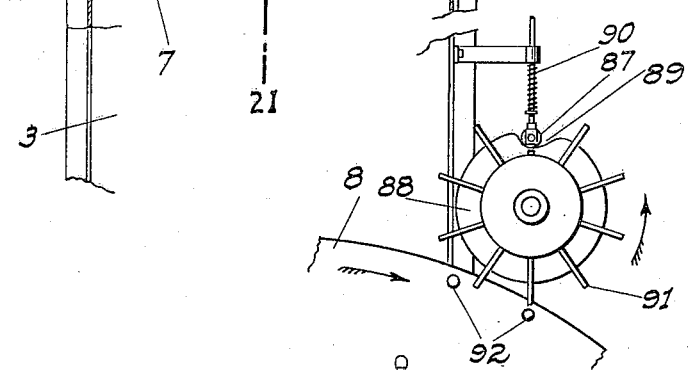
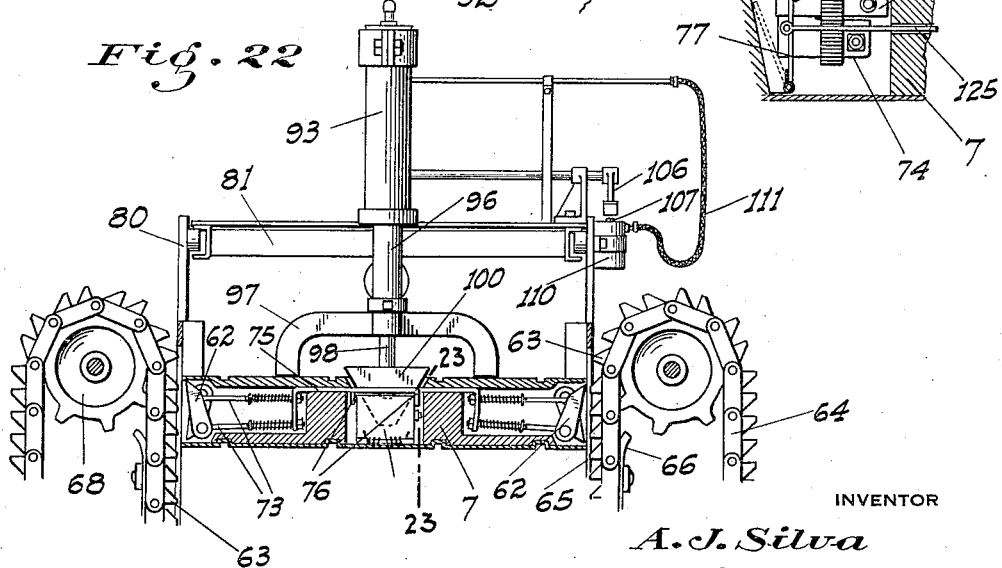

Patented Feb. 2, 1932

1,843,343

UNITED STATES PATENT OFFICE

ANTONE J. SILVA, OF MILTON, CALIFORNIA

CONTINUOUS FEED HAY PRESS

Application filed November 18, 1929. Serial No. 407,945.

This invention relates to hay pressing and baling machines, my principal object being to provide a machine of this character in which the feeding of the hay to the baling chamber and the subsequent pressing of the hay in separate amounts to form separate bales is carried out continuously and automatically. In this manner while one bale is pressed and being tied another quantity of hay is at the same time being pressed without interfering with the pressed bale and without necessitating the halting of the machine at any time. Automatically functioning means also provides for the release of the pressure on the finished bale at a certain period in the cycles of operation of the machine, without releasing the pressure on the bale still being formed.

A further object is to provide a simple mechanism for enabling the pressure to which the hay is subjected when the bale is being formed to be varied at the will of the operator, so that the density of the bales may be correspondingly altered. The construction of the apparatus as a whole is such that in the main the different mechanisms function automatically in predetermined sequence, leaving such few features which are hand controlled as to enable one man to take care of the operation of the machine.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved press.

Fig. 2 is a sectional elevation of the same.

Fig. 3 is a rear end view of the press.

Figs. 4 and 5 are diagrammatic elevations of the mechanism for operating the feed chamber door, the latter being shown in its open and partly closed positions respectively.

Fig. 6 is an enlarged fragmentary view showing the valve controlling mechanism of the air cylinder of the door.

Fig. 7 is a top plan view of the same.

Figs. 8 and 9 are diagrammatic elevations showing the feed chamber plunger and the mechanism for operating the same; the plunger being shown in its fully retracted and partly advanced positions respectively.

Fig. 10 is a fragmentary top plan view showing the operating means for the air valve which controls the flow of air to the plunger actuating cylinder.

Fig. 11 is a fragmentary cross section taken on the line 11—11 of Fig. 2 showing the transverse movable door between the feed and baling chambers.

Figs. 12 and 13 are fragmentary longitudinal views of the automatically functioning means controlling the operation of the transverse door; showing said mechanism as positioned when the door is in its open and closed positions respectively.

Fig. 14 is a fragmentary plan section substantially on the line 14—14 of Fig. 2, showing the bale separating block and the supporting carriage thereof prior to the insertion of the block into the baling chamber.

Fig. 15 is a similar view showing the block in position in the chamber, the top plate and block being partly broken away.

Fig. 16 is a fragmentary transverse section of the block showing the position of the holding dogs therein after the block has been fully advanced into the baling chamber.

Fig. 17 is a similar view showing the position of the dogs before being advanced into the chamber.

Fig. 18 is a perspective shadow outline of the block showing the dogs and the control mechanism thereof mounted in said block.

Fig. 19 is a side elevation of the block releasing mechanism and the control means thereof, said mechanism being in its retracted position.

Fig. 20 is a similar view showing the mechanism advanced into position over the block but before the block holding and block-dog release member has been depressed.

Fig. 21 is a transverse section on the line 21—21 of Fig. 20.

Fig. 22 is a similar view but with the block holding and dog releasing members depressed.

Fig. 23 is a fragmentary longitudinal section of the block on the line 23—23 of Fig. 22.

Fig. 24 is a sectional elevation of the air controlled valve actuating lever trip.

Fig. 25 is a fragmentary view showing the disengageable driving connections between the drive gear and the wheel which operates the baling chamber head.

Fig. 26 is an enlarged fragmentary view showing the automatic block releasing means of the block transferring elevator.

Referring now more particularly to the characters of reference on the drawings, the numeral 1 denotes a horizontal feed chamber having an opening 2 on top into which the hay to be pressed is delivered at intervals by any suitable means. At its rear end this chamber opens into the vertical baling or pressing chamber 3 which projects upwardly some distance above the feed chamber and is freely open on top. A plunger 4 is slidable in the chamber 1 for movement from the outer to the inner end of the same, and a head 5 is slidable in the baling chamber from a point below the feed chamber to the top of the same. A transversely movable door 6 is provided to close the entrance to the baling chamber from the feed chamber when the head is moving up so as to allow the plunger 4 to be then retracted. Bale separating blocks 7 are adapted to be inserted into the baling chamber at intervals and move up as the hay is compressed by the upward strokes of the head 5. The actually pressed bale is finally completed in the area of the baling chamber above the plane of movement of the head 4. The extent to which the bale will be compressed while in this area and which of course alters the density and weight of the same may be controlled by the operator as may be desired, and this pressure regulating means forms one of the major objects of my invention.

The above represent the main or fundamental features of the apparatus, and the parts are operated and their movements synchronized and coordinated relative to each other in a particular manner which will now be described. A main driving gear 8 is mounted on one side of the machine and is adapted to be driven at a constant speed from a power plant of any suitable character applied to a pinion 9 meshing with said gear. The rotation of this gear indirectly controls the operation of practically all the moving parts.

Referring to Figs. 4 to 7 particularly the top opening 2 of the feed chamber 1 is provided with a door 10 pivoted at its forward end and having a segmental gear 11 fixed concentric with its pivot. This gear meshes with a rack 12 formed on the rod of a piston 13 slidable in an air cylinder 14 fixed on the machine. The admission of compressed air from any suitable source to either end of the cylinder is controlled by pipes 15 connected to a two-way valve 16 of suitable character. The operating rod 17 of this valve is reciprocated in one direction or the other by means of a rocker arm 18 to which it is connected and which is pivoted in a fixed position adjacent and to one side of the gear 8. This arm is held to one side or the other of its neutral dead-center position by a snap action spring 19. This arm is provided with opposed extensions 20 and 21 projecting radially from the pivot of the same, said extensions projecting into the path of circumferentially and radially spaced pins 22 and 23 respectively projecting from the gear 8. With the rotation of this gear in a certain direction the pin 22 first engages the extension 20 and moves the same and the arm 18 a certain distance. The spring 19 then acts to quickly move the valve controlling rod the balance of its stroke in that direction, which is that which will cause air to be admitted to that end of the cylinder 14 which will cause the door 10 to be closed. After said door has been closed for a certain time the pin 23 engages the extension 21, causing the arm 18 to be turned in the opposite direction and the spring 19 then acts to shift said arm for the full distance in said opposite direction. This reverses the direction of flow of air into the cylinder 14 and the door is again opened. Said door is thus closed and opened once with every revolution of the gear 8.

Referring to Figs. 8 to 10 the plunger is operated in timed relation with the movement of the door 10 in the following manner:

Said plunger, when the door is opened, is positioned ahead of the opening 2. Said plunger is directly connected by advancing cables 24 to drums 25 and by retracting or return cables 26 with other drums 27 fixed in axial connection with the drums 25. The cables are disposed relative to the drums and the plunger so that when said drums are rotated in one direction the plunger will be drawn past the opening 2 and toward and as far as the baling chamber; and when rotated in the opposite direction the plunger will be moved in the opposite direction also. The drums are preferably of the spiral sheave type, so arranged that the movement of the plunger toward the baling chamber will decrease in speed from one end of the stroke to the other with a constant speed of the drums. The drums are rotated in conjunction with the rotation of the gear 8 in the following manner.

A gear 28 is mounted in connection with the drums, meshing with a rack 29 formed as the piston rod of opposed pistons 30 working in a double ended air cylinder 31. A two-way air control valve 32 controls the flow from a source of compressed air to either one of the pipes 33 leading to the opposite ends of said cylinder. The movement of the valve 32 from one position to the other is controlled by a rocker arm unit 34 of the same character as the member 18. This unit 34 has extensions 35 adapted to be successively engaged, so as to move the arm 34 one way or the other, by the pin 22 and by another pin 36 mounted on the gear between the pins 22 and 23. The actuation of the valve 32 by the pin 22 causes the plunger 4 to be moved toward the baling chamber, and the arm 34 and its extensions are so spaced from the arm 18 that said valve will be thus actuated some time before the pin 23 has caused the valve 16 to be reversed in position, or the door 10 to be again moved to its open position, as previously described. The pin 36 and the corresponding extension 35 are arranged so that said pin will pass by and not affect the extension 21 of the arm 18, and the pin 36 is so spaced from the pin 23 that the valve 32 will be reversed in position, and the plunger retracted or returned to its outermost position, before the valve 16 has been reversed in position by the pin 23 and the door 10 again opened.

Just as the plunger 4 reaches a position immediately adjacent the baling chamber the transverse door 6 automatically moves across said chamber immediately ahead of the plunger. This movement is accomplished by means of the arrangement of parts particularly illustrated in Figs. 11 to 13. This door at its bottom is provided with rollers 37 riding on a laterally projecting track 38 extending from one side of the machine across the feed chamber at the bottom.

The door at its outer edge is connected to the rod 39 of a piston 40 operating in an air cylinder 41. Pipes 42 lead to the opposite ends of this cylinder from a two-way valve 43 connected to a source of compressed air. This valve is operated by a rocking arm unit indicated generally at 44 to the same character as those previously described. This unit is moved in one direction by a lug 45 projecting from the plunger 4 and engaging said unit just as the plunger reaches its innermost position. The valve 43 is then moved to a position such as will cause air flowing into the cylinder to move the door 6 inwardly or across the opening of the feed chamber. The valve controlling unit is moved in the opposite direction, to cause the setting of the valve to be reversed and the door to be opened or drawn out by a trip member 46 which is arranged to be engaged and moved to throw said unit, upon the arrival of the head 5, to its bottom stroke position.

The head 5 is raised on a hay pressing stroke, just after the transverse door has been moved in as above described, by the following means:

Mounted inside the gear 8 and concentric with and turnable relative thereto is a wheel 47 having a dog 48 adapted to project from the periphery thereof to engage a notch 49 cut in the adjacent inner periphery of the gear (see Fig. 25). A cable 50 is swivelly connected to the outer face of said wheel near the dog and is normally wound, when the point of connection of the cable with the wheel is at the bottom of the latter, about a drum 51. This drum is fixed with other drums 52 having cables 53 secured thereto which extend upwardly over pulleys 54 mounted on the sides of the baling chamber above the feed chamber, and then down to connections with the head 5 at the sides of the same.

The drums and cables are arranged so that when the cable 50 is wound on the drum 51 the cables 53 are unwound from the drums 52 and the drum is in its lowermost position, and vice-versa. The notch 49 is positioned so as to engage the dog and cause the wheel 47 to be rotated with the gear, just after the door 6 has been moved in. This rotation of the wheel causes the cable 50 to be unwound from its drum and the cables 53 to be wound onto their drums, thus raising the head 5. The drums are designed so that the movement of the head will decrease in speed as is necessary, while the leverage between the drum 51 and the point of connection of the cable 50 with the wheel 47 is increased. As soon as the point of connection of the said cable 50 passes top dead-center (when the head is raised to its full height), the weight of the head tending to drop causes said wheel to overrun the gear, and said wheel will rotate the remaining one-half turn at a much greater speed than that of the gear. The head will thus be returned to its lowermost position almost instantly where it will remain until the notch in the gear again reaches and engages the dog 48. It is with this downward movement of the head that the trip 46 is actuated to cause the door 6 to be again opened as previously described. Also in the period between the release of the wheel dog from the notch and its subsequent engagement, the plunger 4 is retracted and again advanced, the door 10 is again opened and closed and the door 6 is again closed, all in the manner previously recited; so as to permit a further feeding of hay into the baling chamber above the plunger to be carried out before the latter is again raised on a pressing stroke, which will obviously be once with every revolution of the gear. Mounted beyond the end of the baling chamber, which is opposite to the feed chamber, are rollers 55 which support a horizontally movable carriage 56.

The bale separating blocks 7 are of a size to snugly fit the baling chamber and removably rest on said carriage, which is long enough to hold at least two blocks in end to end relation. This carriage is preferably moved in jacent the gear 8. For the major portion of its periphery this cam is circular and concentric with its axis and the valve is maintained in a position such that the carriage remains retracted relative to the baling chamber. At a certain point in its periphery however this cam has a depression 89 into which the roller may drop, impelled by a spring 90, and which causes the valve to be moved to the position necessary to cause the carriage to be advanced over the baling chamber. Fixed with the cam is a ten-armed spider 91, the arms of which project over the side of the gear 8 so as to be successively engaged and the cam moved through one-tenth of a revolution each time by circumferentially spaced pins 92 projecting from said gear. The pins are positioned so that the spider will be rotated by the first pin just as the head 5 reaches the top of its stroke. With every revolution of the gear the spider is thus rotated one-fifth of a turn so that with every five revolutions of said gear the valve rod roller drops into the cam depression for a short length of time so that the carriage will be moved over the baling chamber, and again withdrawn from said depression to cause the cam to be retracted. While I have specified five revolutions of the parts as being necessary to cause the valve to be actuated once, it will be obvious that a different number of revolutions with a corresponding different number of reciprocations of the head 5 may be utilized instead if desired.

Mounted on the carriage at the end nearest the baling chamber is a vertical upstanding air cylinder 93 having a piston 94 slidable therein which is normally retained at the top of the cylinder by a spring 95 (see Fig. 21.) The piston rod 96 carries an inverted U-shaped cross head 97 on its lower end adapted at its ends to bear on the block 7. A stem 98 is slidable in the piston rod and projects from the lower end of the same, a compression spring 99 resisting the upward movement of the stem in the rod. The lower end of this stem carries a wedge or triangular shaped head 100 adapted to project through a slot 101 cut in the top of the block in alinement with the space between the bars 75 and the lugs 76. Normally the piston and the connected parts are held at their uppermost positions and air is delivered into the cylinder above the piston to depress the same only after the carriage has moved over the baling chamber, the feeding of the air being controlled by such movement. This is accomplished as follows:

An air valve 102 is fixed with the cylinder 93, a pipe 103 leading from the valve to the cylinder. The valve operating rod is connected to a snap action rocker arm unit 104 from one arm of which a rod 105 extends to a connection with a trip lever 106 pivoted on the carriage toward the outer end of the same. The lower end of this lever is positioned to be engaged by a pin 107 mounted in connection with one of the brackets 80; such engagement only taking place after the carriage has moved almost to its full distance inwardly of or over the baling chamber. The full extent of movement of the carriage is such that when retracted the head 100 and the adjacent parts are clear of the baling chamber, and when advanced said head is in line with the block slot 101. Said engagement of the lever 106 with the pin 107 causes the valve 102 to be moved so that air is admitted to the cylinder 93 and the block and head depressed. Such depression causes the head 97 to bear against the block 7, while the wedge 100 enters the slot 101 and separates the lugs 76. This pulls in the dogs 62 so that they clear the chain teeth and permit the plate 77 to pass between lugs operated so that said dogs will not again move out when the wedge is withdrawn. The cross head 97 holds the block against vertical movement while the wedge is releasing the dogs, so that said block cannot then immediately spring up with the release of pressure.

As the piston 94 reaches its lowest position a trip arm 108 mounted in connection with the piston rod 96 at its lower end engages the rocker arm unit 104 and returns the same, the lever 106 and the valve 102 to their original positions, thus allowing air from the cylinder 93 to escape to the atmosphere. The spring 95 then functions to raise the heads 97 and 100 clear of the block. This is done just before the rear pin 92 on the gear rotates the spider to return the valve 84 to its original position, and which causes the carriage to be retracted. It is therefore necessary that the pin 107 shall be moved out of the way to allow the lever 106 to return to its original position. This is done by mounting the pin 107 in fixed connection with a piston 109 slidable in a fixed cylinder 110; said cylinder being connected by a flexible conduit 111 with the pipe 103 so that air will enter the cylinder 110 and depress the pin when air is admitted to the cylinder 93; and will hold the same depressed until the air is subsequently released from said cylinder 93. A spring 112 then returns the pin to its normal position ready to again engage the lever 106 upon the next advancing movement of the same.

The wiring of the bale is done before the uppermost block is released and when released as above described, the block is removed by hand and is slid over fixed rails 113 onto a counterweighted elevator structure 114 which is disposed directly above the outer or rear end of the carriage 56 and is slidable on vertical skirts 115 upstanding from the supporting bracket of said carriage. A hand actuated brake structure 116 is associated with the elevator to prevent downward movement of the same when loaded until desired. The elevator includes hinged and opposed block supporting rails 117 each normally held horizontal by a spring catch 118 having an extension 119 projecting outwardly from its lower end. This extension is adapted to be engaged by a pin 120 projecting from the adjacent standard toward its lower end. This will cause the catch to be released from the elevator rail (see Fig. 26), thus allowing the rail to tilt down and letting the block drop into a seating position on the carriage 56, ready for a subsequent reinsertion into the baling chamber. In the meantime the finished bale is pushed up by the bale being formed below until it is in position to be readily tilted laterally from the upper end of the baling chamber and thus removed therefrom.

All this time the plate 77 remains in position between the lugs of the block so as to hold the dogs retracted so that no interference with the subsequent sliding of the block into the baling chamber is had. The plate is released from said lugs upon the insertion of the block into the chamber, so as to allow the dogs to project outwardly and function by the following means (see Figs. 14 and 15). Projecting from one side of the carriage 56 is a lug 121 positioned, when said carriage reaches its innermost position in the baling chamber, to engage the adjacent end of a rod 122 extending alongside said chamber to the front of the same. This rod is connected to one end of a rocking lever 123 pivoted on the front of the baling chamber and having on its opposite end a pin 124 slidable in the adjacent wall of the chamber. This pin is in line with a rod 125 slidable in the block and connected at its inner end to the plate 77.

When the carriage and block are advanced the pin 123 is advanced into the baling chamber and it engages and pushes the rod 125 rearwardly, causing the plate 77 to be moved clear of the lugs 76, which, as above stated, permits the dogs to project outwardly of the block to engage the respective notches and teeth. When the carriage is retracted so that the lug 121 disengages the rod 122, a spring 126 acts to return the pin 124 to its outward position or so that it does not project into the baling chamber to interfere with the upward movement of the block.

It will thus be seen that all operations from the time the hay is fed into the press until the compressed and finished bale is released are automatically carried out, except the actions of placing and removing the bale supporting blocks. It will also be seen that any desired pressure may be exerted on the bale during its formation.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A hay press including a baling chamber and a feed chamber opening into the same; a plunger in the feed chamber, means for reciprocating said plunger, the feed chamber having a feed-in opening disposed between the baling chamber and plunger when the latter is in its retracted position, a door for said opening, and means operated in synchronized conjunction with the plunger reciprocating means for causing the door to fully close just before the plunger starts on its advancing movement, and for causing said door to open only after the plunger has again returned to a fully retracted position.

2. A hay press including a baling chamber and a feed chamber opening into the same; a plunger in the feed chamber, means for reciprocating said plunger from a retracted position in the feed chamber to one immediately adjacent the baling chamber, a door movable to close the opening between the feed and baling chambers, means for thus moving the door, and means controlled by the arrival of the plunger to its fully advanced position for causing said door moving means to function.

3. A structure as in claim 2, with a presser head in the baling chamber normally disposed beyond the door, and means operated in timed conjunction with the closing of the door for moving the presser head on a pressing stroke.

4. A structure as in claim 2, with a presser head in the baling chamber movable across the door-opening and normally disposed beyond the door, means functioning to reciprocate the head from such position after the door has moved to a closed position, and means operated by the plunger upon its return to the first named position for then causing the door to be opened.

5. A hay press including a baling chamber and a feed chamber opening into the same, a movable door for said opening, means for reciprocating said door, reversible control means for said reciprocating means, a presser head in the baling chamber movable across the opening and normally disposed beyond one end of the same, means for reciprocating the head, means operating in conjunction with the head reciprocating means for moving said control means in one direction to cause the door to close just before the head starts on a pressing stroke, and means actuated by the head upon its return to its normal position for reversing said control means to cause the door to then again move to an open position.

6. In a hay press, a vertical baling chamber, a presser head slidable therein, a driven rotatable member, a wheel turnable relative to and concentric with said member, cable means connected at one end to the wheel on one side and at the other end to the head to cause the head to be raised when said wheel is turned in one direction a certain arcuate distance from a predetermined position, a dog mounted in and adapted to project from the wheel, and a notch in said member positioned to be engaged by the dog with the rotation of the member so that said member and wheel will rotate together until the point of connection of the cable means with the wheel passes an upper dead center position on said wheel.

7. In a hay press, a vertical baling chamber, a horizontal carriage movable into and out of said chamber, bale separating blocks removably supported on the carriage whereby when the latter is moved into the chamber a block will be likewise moved into the same, dogs mounted in the block and adapted to project from the sides of the same to engage notches in the walls of the chamber to hold the block against downward movement, means holding said dogs retracted in the block as the latter is inserted into the chamber, and means actuated by the movement of the carriage to a full block inserting position for then releasing said dog holding means.

8. In a hay press, a baling chamber, bale separating blocks removably mounted in the chamber and movable along the same as the hay between the blocks is pressed, dogs projecting from the outermost block, teeth engaged by the dogs, endless chains on which said teeth are mounted whereby when the block advances said chains will be moved, means for retarding the movement of said chains at will and automatically functioning means for withdrawing the dog from the teeth when the outermost block reaches a predetermined position in the baling chamber whereby to release the pressure on the block and permit the same to be withdrawn.

9. In a hay press, a baling chamber, bale separating blocks removably mounted in the chamber and movable along the same as the hay between the blocks is pressed, dogs projecting from the outermost block, teeth engaged by the dogs, members movable in the direction of movement of the blocks on which said teeth are mounted, means for retarding the movement of said members at will, separable lugs mounted in the block and connected to the dogs in a manner to cause separation of said lugs to retract the dogs from the teeth, said lugs being exposed through a slot in the outer face of the block, a head to enter the slot and engage and separate the lugs, a vertically movable stem projecting upwardly from said head, a horizontally movable carriage from which said stem is supported, normally disposed to one side of the chamber, means functioning upon the arrival of the block at a predetermined position in the baling chamber for causing the carriage to be advanced over the chamber so that the head is vertically alined with the slot, and means functioning with the movement of the carriage to a fully advanced position for causing the head to be depressed into the block-slot.

10. A structure as in claim 9, with means causing the head to be retracted as soon as it reaches a fully depressed position, and means functioning as soon as the head has returned to a retracted position for causing the carriage to be retracted.

11. A structure as in claim 7, in which said last named means comprises a lever extending transversely of the baling chamber and pivoted intermediate its ends on the end thereof opposite to the direction of advancing movement of the carriage and block and on a level therewith, a pin on one end of the lever projectable through and registering with an opening provided in the adjacent end of a block when the latter is fully in position in the chamber, means between the carriage and lever for turning the latter in a direction to cause the pin to move inwardly of the block when the carriage moves to a fully advanced position, and a member in the block connected to the dog releasing means and actuated by the movement of the pin to release said releasing means.

12. In a hay press, a baling chamber, bale separating blocks removably mounted in the chamber and movable along the same as the hay between the blocks is pressed, dogs projecting from the outermost block, teeth engaged by the dogs, endless chains on which said teeth are mounted whereby when the block advances said chains will be moved, a presser head in the baling chamber for pressing the hay and causing the blocks to be advanced, means for reciprocating said head, means for withdrawing the dogs from engagement with the teeth, and means actuated by the head reciprocating means for causing said dog releasing means to function once with every predetermined number of reciprocations of the head.

In testimony whereof I affix my signature.
ANTONE J. SILVA.